United States Patent [19]

Cooper

[11] Patent Number: 5,494,693
[45] Date of Patent: Feb. 27, 1996

[54] COMPOSITIONS USEFUL AS HIGH TEMPERATURE MEDIA AND METHOD OF PREPARING

[75] Inventor: Charles F. Cooper, Paoli, Pa.

[73] Assignee: ARCO Chemical Technology, L.P., Greenville, Del.

[21] Appl. No.: 89,922

[22] Filed: Jul. 9, 1993

Related U.S. Application Data

[63] Continuation of Ser. No. 714,405, Jun. 11, 1991, abandoned, which is a continuation-in-part of Ser. No. 448,400, Dec. 11, 1989, abandoned.

[51] Int. Cl.$^6$ .................................................. A23L 1/00
[52] U.S. Cl. .................. 426/531; 426/601; 426/611; 426/804; 536/18.3; 554/227
[58] Field of Search ................................ 426/601, 602, 426/603, 606, 607, 611, 531, 804; 554/161–165, 168, 169, 172, 227, 228; 536/18.3

[56] References Cited

U.S. PATENT DOCUMENTS

| | | | |
|---|---|---|---|
| 2,610,125 | 9/1952 | Valko | 99/123 |
| 2,968,563 | 1/1961 | Houser | 99/118 |
| 3,337,595 | 8/1967 | Lamont | 260/410.6 |
| 3,490,918 | 1/1970 | Egan et al. | 99/118 |
| 4,169,901 | 10/1979 | Kravis | 426/601 |
| 4,849,242 | 7/1989 | Kershner | 426/601 |
| 4,861,613 | 8/1989 | White et al. | 426/611 |
| 4,952,413 | 8/1990 | LaBarge et al. | 426/6 |
| 4,983,329 | 1/1991 | Cooper | 554/172 |
| 5,059,443 | 10/1991 | Ennis et al. | 426/531 |

FOREIGN PATENT DOCUMENTS

| | | |
|---|---|---|
| 0287157 | 10/1988 | European Pat. Off. . |
| 0353928 | 2/1990 | European Pat. Off. . |
| 0396406 | 5/1990 | European Pat. Off. . |
| 0396405 | 11/1990 | European Pat. Off. . |
| 0415635 | 3/1991 | European Pat. Off. . |
| 207070 | 2/1984 | Germany . |
| 55-79313 | 6/1980 | Japan . |
| 55-160710 | 12/1980 | Japan . |
| 2129004 | 5/1984 | United Kingdom . |

OTHER PUBLICATIONS

Potter, N. N. Food Science, third edition, 1978, pp. 478–482, AVI Publishing Company, Inc., Westport, CT.
Hamm, "Vegetable Oils", *Kirk–Othmer Encyclopedia of Chemical Technology*, vol. 23, pp. 717–741, Wiley–Interscience (1983).
Yoo et al., *Polymer Preprints*, 28(2), 358 (1987).
Meith et al., *Die Nahrung*, 27, 853 (1983).
*Bailey's Industrial Oil and Fat Products*, vol. 3, pp. 11–113, Wiley (1985).
Applewhite, "Fats and Fatty Oils," *Kirk–Othmer Encyclopedia of Chemical Technology*, vol. 9, pp. 795–831, Wiley Interscience (1983).

Primary Examiner—Leslie A. Wong
Attorney, Agent, or Firm—Stephen D. Harper

[57] ABSTRACT

Compositions useful as high temperature media are disclosed which are blends of fatty acid esters and aliphatic ethers. The fatty acid esters have iodine numbers of at least about 10 and are preferably lipids derived from vegetable, animal, or marine sources. Reduced calorie high temperature cooking compositions suitable for frying applications and exhibiting greatly improved resistance to thermal degradation may be obtained by the use of an esterified alkoxylated polyol as the aliphatic ether component.

21 Claims, 3 Drawing Sheets

COMPOSITIONS USEFUL AS HIGH TEMPERATURE MEDIA AND METHOD OF PREPARING

This is a continuation of application Ser. No. 07/714,405, filed Jun. 11, 1991, now abandoned, which is a continuation-in-part of parent application Ser. No. 07/448,400, filed Dec. 11, 1989, now abandoned.

FIELD OF THE INVENTION

This invention pertains to compositions useful as high temperature media. More specifically, the invention relates to compositions comprised of fatty acid esters having iodine numbers of at least about 10 such as lipids derived from vegetable, animal or marine sources and aliphatic ethers such as polyethers having oxyalkylene repeating units.

This invention additionally pertains to methods of thermally stabilizing aliphatic ethers.

BACKGROUND OF THE INVENTION

Aliphatic ethers, especially polyethers, are commonly employed in end-use applications requiring exposure to high temperatures for extended periods of time. However, the general susceptibility of aliphatic ethers to thermal and oxidation degradation due to the inherently unstable nature of the ether bond has somewhat limited such uses due to the tendency of aliphatic ethers to evolve volatile decomposition products at high service temperatures.

For example, esterified alkoxylated polyols have recently been proposed for use as reduced calorie fat substitutes (as described in U.S. Pat. No. 4,861,613). Although esterified alkoxylated polyols may be readily incorporated into baked goods or in foods such as salad dressing or ice cream which do not require heating, such materials show signs of instability in pan frying or deep fat frying applications. Of the many tests available for measuring thermal stability, the one that has been found most useful for comparing the stability of esterified alkoxylated polyols with that of conventional edible oils is weight loss over time at a constant temperature. This is a useful test from a practical standpoint since cooking oils or fats will last longer and need less-frequent replenishing if weight loss can be minimized. The same weight loss problem may also be observed to a lesser extent in baking or other cooking techniques employing lower temperatures than frying. Although decomposition is expected to be less pronounced at lower temperatures, enhanced stabilization is still highly desirable.

Similarly, polyethers such as polypropylene glycol and ethylene oxide/propylene oxide copolyether polyols are often utilized as lubricants, hydraulic fluids, heat transfer media, or other types of functional fluids. Polyether functional fluids are typically subjected to high temperatures for extended periods of time and thus require stabilization against thermal degradation.

SUMMARY OF THE INVENTION

This invention provides a composition suitable for use as a high temperature medium comprising from about 10 to 90 weight percent of a fatty acid ester having an iodine number of at least about 10 and from about 10 to 90 weight percent of a aliphatic ether. The fatty acid ester is preferably a $C_{12}$–$C_{24}$ fatty acid ester of glycerin and may be a lipid derived from a vegetable, animal, or marine source. The aliphatic ether is preferably a polyether having oxyalkylene repeating units such as an esterified alkoxylated polyol or a saturated aliphatic polyether having repeating units selected from the group consisting of oxyethylene, oxytrimethylene, oxypropylene, oxytetramethylene, and oxybutylene and having a number average molecular weight of from about 250 to 30,000. Compositions comprised of an esterified propoxylated glycerin and an edible lipid such as a vegetable oil are useful as reduced calorie high temperature cooking media having enhanced thermal stability.

This invention also provides a method of thermally stabilizing an aliphatic ether which comprises combining from 10 to 90 parts by weight of the aliphatic ether with 100–x parts by weight of a fatty acid ester having an iodine number of at least about 10, wherein x represents the parts by weight of the aliphatic ether.

DETAILED DESCRIPTION OF THE INVENTION

Figure 1:
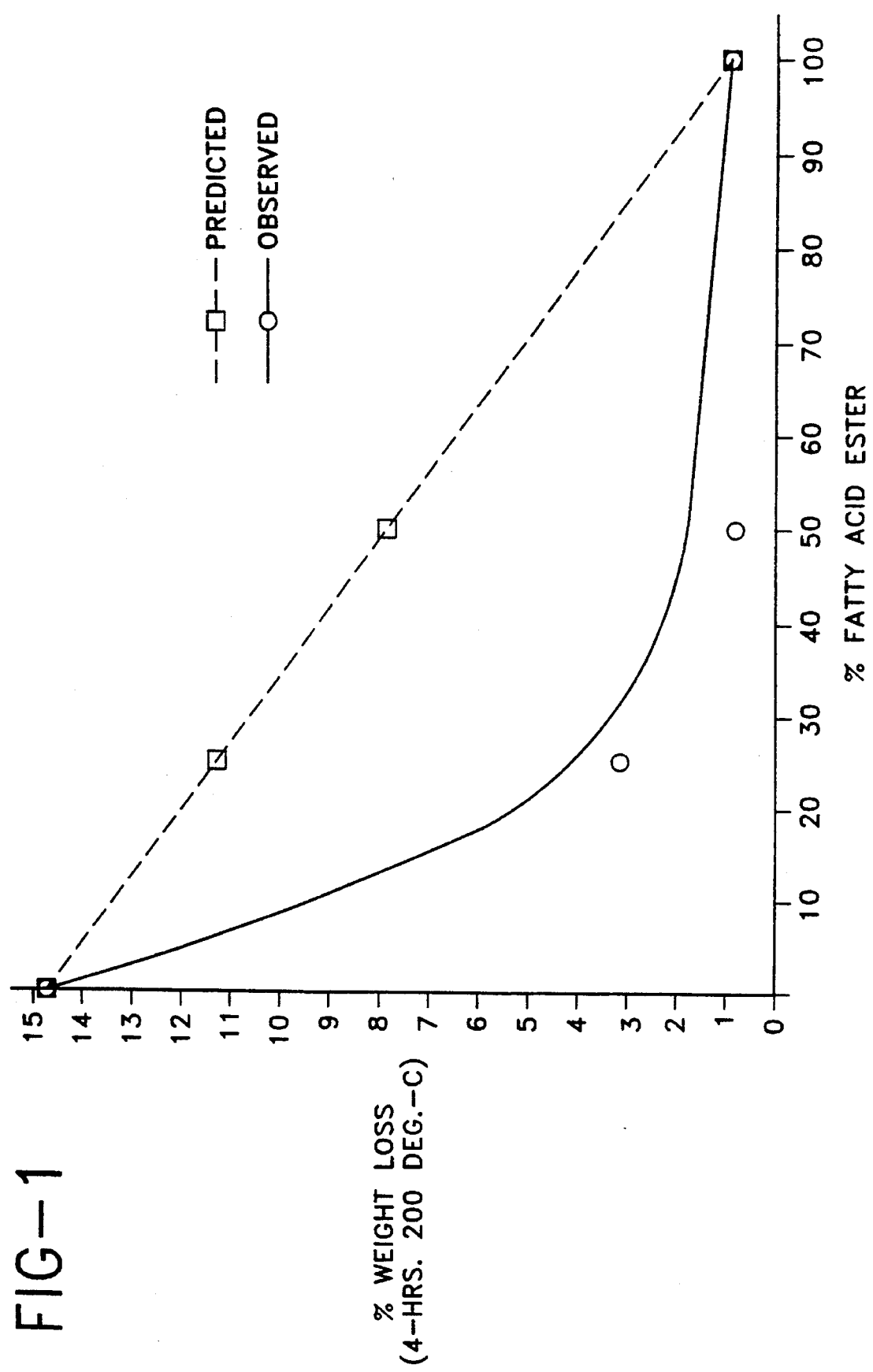
FIGS. 1, 2, and 3 graphically illustrate the thermal stabilization of an aliphatic ether in accordance with the invention.

Ethers suitable for use in the compositions of this invention include any organic compound in which an oxygen atom is interposed between two aliphatic carbon atoms in the molecular structure. The aliphatic ether preferably has a number average molecular weight of from about 250 to 30,000 and preferably has a boiling point at atmospheric pressure of at least about 200° C. It is generally desirable that the ether be liquid or a low melting solid and substantially miscible with the lipid component of the composition. The ether may be a monoether or, more preferably, a polyether containing oxyalkylene repeating units. Illustrative and preferred oxyalkylene repeating units include, but are not limited to, oxyethylene (—$OCH_2CH_2$—), oxypropylene

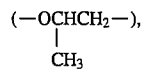

and oxytrimethylene (—$OCH_2CH_2CH_2$—), oxybutylene

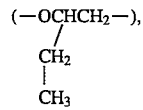

and oxytetramethylene (—$OCH_2CH_2CH_2CH_2$—).

In a particularly preferred embodiment, the ether is an esterified alkoxylated polyol. The polyol can be any polyalcohol containing at least two hydroxyl groups (more preferably, at least three hydroxyl groups). The polyol is alkoxylated with a $C_2$–$C_{12}$ cyclic ether selected from the group consisting of epoxides, oxetanes, and oxolanes, and the resulting alkoxylated polyol esterified either fully or partially with a carboxylic acid or carboxylic acid derivative such as an alkyl ester or acid halide. Suitable polyols include glycols such as ethylene glycol, propylene glycol, 1,4-butanediol, and the like, triols such as glycerin, trimethylolpropane, trihydroxyhexane, and the like, tetrols such as pentaerythritol, as well as higher functionality polyols such as sugar alcohols (e.g., xylitol, erythritol, mannitol, sorbitol), monosaccharides (e.g., xylose, arabinose, ribose, erythrose, glucose, manrose, galactose, fructose, sorbose), disaccharides (e.g., maltose, lactose, sucrose, cellobiose), oligosaccharides, polysaccharides (e.g., starch, cellulose), and alkyl glycosides (e.g., β-methyl glucoside). Examples of cyclic ethers which may be used include ethylene oxide, propylene oxide, 1-butene oxide, styrene oxide, cyclohexene oxide, isobutylene oxide, phenyl glycidyl ether, epichlorohydrin, oxetane, 2,2-dimethyl oxetane, tetrahydrofuran, and the like.

The ester groups of the esterified alkoxylated polyol may be derived from any carboxylic acid or carboxylic acid derivative, including $C_1$–$C_{30}$ linear or branched aliphatic, aralkyl, and aromatic carboxylic acids. The carboxylic acid may be saturated or unsaturated and may contain other substituents such as hydroxyl. In a particularly preferred and useful embodiment of this invention, the carboxylic acid is a saturated $C_{12}$–$C_{22}$ fatty acid such as stearic acid, behenic acid, myristic acid, lauric acid, palmitic acid, eicosanoic acid, and the like and mixtures thereof.

If the composition is to be employed as a reduced calorie high temperature cooking medium, it is preferable to use an esterified alkoxylated polyol of formula

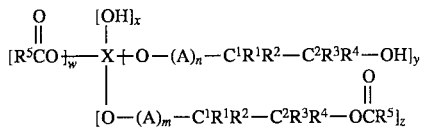

wherein X is an organic radical derived from a polyol, the sum of $w+x+y+z$ is from 2 to 8, $$\frac{x+y}{w+x+y+z}$$

is an average number in the range of from 0 to about 0.50, z is an average number in the range of from about 2 to the sum of $w+x+y+z$, A is an oxyalkylene unit, $R^5$ is a $C_7$–$C_{23}$ hydrocarbon group, at least one of $R^1$, $R^2$, $R^3$, or $R^4$ is a moiety other than hydrogen, and $C^2$ is a carbon that on average is from 0 to about 15 percent primary (more preferably, from 0 to about 5 percent primary).

Preferably, X is a glyceryl radical and z is an average number of from about 2 to 3. A is most preferably an oxypropylene unit where one only of $R^1$, $R^2$, $R^3$, or $R^4$ is methyl with the other R groups being hydrogen. The degree of alkoxylation, for purposes of reduced digestibility, is desirably adjusted so that the average value of $[(m\cdot z)+(n\cdot y)]$ is in the range of from 0 to about 25. The ester groups

are preferably derived from $C_{12}$–$C_{22}$ fatty acids, including unsaturated as well as saturated fatty acids. Preferably, the esterified alkoxylated polyol is essentially saturated (i.e., has an iodine number less than about 10). Illustrative esterified alkoxylated polyols suitable for use in the compositions of this invention are described in more detail in U. S. Pat. No. 4,861,613, the teachings of which are incorporated herein by reference in their entirety.

Examples of other aliphatic polyethers which may be used as components of reduced calorie high temperature cooking media in accordance with this invention include esters and ethers of polyglycerols and polyglycols as described in East German Pat. Spec. No. 207,070 and fatty acid esters of polyoxyalkylenes which are substantially hydrolyzed upon ingestion as described in U.S. Pat. No. 4,849,242. The teachings of these patents are incorporated herein by reference in their entirety.

In another preferred embodiment, the ether component of the composition of this invention is a saturated aliphatic polyether polyol having oxyalkylene repeating units. The oxyalkylene repeating units may be oxyethylene, oxytrimethylene, oxypropylene, oxytetramethylene, oxybutylene, and the like or any combination thereof. Illustrative saturated aliphatic polyether polyols include, but are not limited to, polypropylene glycols, polyethylene glycols, ethylene oxide/propylene oxide polyether polyols (block or random, linear or branched), polytetramethylene glycols, polytrimethylene glycols, and the like and mixtures or blends thereof. The polyether polyols may have hydroxyl end-groups or any other type of end-groups, including alkyl ether end groups. Such compounds are well-known in the art and are described, for example, in "1,2-Epoxide Polymers," *Encyclopedia of Polymer Science and Technology,* Second Edition, Vol. 6, pp. 255–307, Wiley-Interscience (1986), the teachings of which are incorporated herein in their entirety.

Examples of suitable saturated aliphatic polyether polyols which are commercially available include the LB series of Ucon® fluids and lubricants available from Union Carbide, which are mono-alcohol started oxypropylene polymers ranging in number average molecular weight from about 340 to 2490, as well as the HB series of Ucon® fluids and lubricants, which are mono-alcohol started polyethers containing one terminal hydroxyl group and equal amounts by weight of oxyethylene and oxypropylene groups and having number average molecular weights of from about 270 to 3930. Also suitable for use are polytetramethylene ether glycols such as Terathane® 1000 and Terathane® 2000 (products of E. I. duPont de Nemours & Company) and homopolyols or copolyols of propylene oxide and ethylene oxide such as Thanol® PPG-2000 (a 2000 molecular weight polyoxypropylene diol sold by ARCO Chemical Company), Thanol® SF-55-5 (a 5000 molecular weight polyoxypropylene triol capped with about 15 weight percent ethylene oxide sold by ARCO Chemical Company), and Thanol® F-3520 (a 3500 molecular weight random copolymer triol of ethylene oxide and propylene oxide sold by ARCO Chemical Company).

The other component of the composition of this invention is a fatty acid ester having an iodine number of at least about 10. More preferably, the iodine number is at least about 50. Any ester of a long chain carboxylic acid may be employed, provided the resulting fatty acid ester contains at least some unsaturation, but preferably a $C_{12}$–$C_{24}$ fatty acid ester of glycerin (a mono-, di-, or triglyceride, for example) is employed. Esters of other alcohols such as methanol, ethanol, $C_3$–$C_{24}$ alkanols (linear, branched, or cyclic, saturated or unsaturated), phenol, ethylene glycol, propylene glycol, 1,4-butanediol, trimethylolpropane, trihydroxyhexane, pentaerythritol, sugar alcohols, monosaccharides, disaccharides, oligosaccharides, polysaccharides, and the like may also be used, however. A lipid (i.e., a fat or oil) derived from a vegetable, animal, or marine source may suitably be employed as the fatty acid ester in this invention. Such lipids are well-known and readily available, as described in "Fats and Fatty Oils," *Kirk Othmer Encyclopedia of Chemical Technology,* Vol. 9, pp. 795–831, Wiley-Interscience (1983) and "Vegetable Oils," *Kirk Othmer Encyclopedia of Chemical Technology,* Vol. 23, pp. 717–741, Wiley-Interscience (1983). The teachings of these articles are incorporated herein by reference in their entirety. Illustrative lipids include, but are not limited to, poultry fat, tallow, lard, fish oil, milk fat, theobroma oil, corn oil, olive oil, safflower oil, cottonseed oil, coconut oil, peanut oil, soy bean oil, rapeseed oil, palm oil, sunflower oil, and mixtures thereof. Partially hydrogenated derivatives of these lipids may also be used. Lipids of this type are comprised predominantly of glyceride esters of $C_{12}$–$C_{24}$ fatty acids. The fatty acids typically are mixtures of saturated and unsaturated fatty acids. A single glyceryl residue may bear up to three fatty acid moieties, each of which may be the same or different and which may vary in chain length, degree of unsaturation, and so forth. Preferably, the lipid will contain at least one glyceryl ester of at least one $C_{12}$–$C_{24}$ unsaturated fatty acid selected from the group consisting of oleic acid, linoleic acid, ricinoleic acid, gadoleic acid, arachidonic acid, eicosatetraenoic acid, cetoleic acid, docosapentaenoic acid, palmitoleic acid, linoleic acid, eleostearic acid, and erucic acid.

The fatty acid esters usable in this invention may, of course, be prepared synthetically using any suitable method known in the art such as direct esterification, transesterification, ester interchange, or reaction of an alcohol with a fatty acid halide.

The high temperature media compositions of this invention are comprised of from about 10 to 90 weight percent of the fatty acid ester and from about 10 to 90 weight percent of the aliphatic ether. More preferably, from about 25 to 75 weight percent of each component is present. Sufficient fatty acid ester is added to enhance the thermal stability of the aliphatic ether relative to the stability of the aliphatic ether in the absence of the fatty acid ester. This amount will vary, of course, depending on the chemical composition of the fatty acid ester (especially the level of unsaturation present, as reflected in the iodine number value) as well as the number of ether linkages in the aliphatic ether, among other factors. For reasons that are not well understood, the enhancement in thermal stability observed is generally far greater than would be expected from a simple dilution effect.

A more quantitative method of determining the amount of unsaturated fatty acid ester which must be combined with the aliphatic ether in order to provide a significant degree of thermal stabilization is by calculation of the ratio of milliequivalents of unsaturation contributed by the fatty acid ester in the total composition divided by the milliequivalents of oxyalkylene units (i.e., ether linkages) in the total composition. The value of $$\frac{\text{milliequivalents fatty acid ester unsaturation per gram}}{\text{milliequivalents oxyalkylene units per gram}}$$

$$\left(\text{hereafter abbreviated as } \frac{\text{Unsat.}}{OA}\right)$$

in the composition must generally be at least about 0.05, and more preferably is at least about 0.15, in order to provide a composition having significantly improved resistance towards degradation at high temperature as compared to the aliphatic ether alone.

This numerical value may be readily calculated for any composition within the scope of this invention. Conventional wet chemical or spectroscopic analyses may be used to measure the amount of unsaturation and the oxyalkylene content of each of the composition components. If an esterified alkoxylated polyol or aliphatic polyether polyol is used as the aliphatic ether component, the oxyalkylene content of the aliphatic ether may be readily estimated from the following equation:

$$\text{meq. oxyalkylene/g} = \frac{\frac{\text{moles cyclic ether per mole initiator} \times 1000}{\text{number average molecular weight of aliphatic ether}}}{}$$

For example, if glycerin (the initiator) is propoxylated to a hydroxyl number of 308 mg KOH/g, the number average molecular weight will be 546 g/mole. The oxyalkylene content of the resulting aliphatic polyether polyol is calculated as follows:

$$\text{meq. oxyalkylene/g} = \frac{(546 - 92)/58}{546} \times 1000 = 14.3 \text{ meq/g}$$

For an esterified propoxylated glycerin prepared from hydrogenated coconut fatty acids and the aforementioned propoxylated glycerin, as described in the examples of this specification, the molecular weight is 1143 g/mole. The oxyalkylene content is therefore calculated as $$\text{oxyalkylene/g} = \frac{(546 - 92)/58}{1143} \times 1000 = 6.8 \text{ meq/g}$$

The amount of unsaturation in the fatty acid ester component may be measured experimentally by AOCS Methods Tg 1-64, Tg 1a-64, Tg 2a-64, Tg 3a-64, Cd 1-25, Cd 1b-87, Cd 1c-85, and Da 15-48. However, since these methods report unsaturation as iodine number (i.e., g $I_2$/100 g sample), the milliequivalents of unsaturation per gram can be determined using the following equation:

$$\text{meq. unsat./g} = \frac{\text{iodine number}}{253.8} \times 10$$

For example, partially hydrogenated vegetable oil has an iodine number of 87.2 and thus 3.4 meq/g unsaturation.

The unsaturation and oxyalkylene content of the individual composition components are thereafter used to determine $$\frac{\text{Unsat.}}{AO}$$

for the overall composition as follows:

$$\frac{\text{Unsat.}}{AO} = \frac{(\text{Wt. \% Unsat. Fatty Acid Ester in Composition}) \times \text{meq. unsat./g}}{(\text{Wt. \% Aliphatic Ether in Composition}) \times \text{meq. oxyalkylene/g}}$$

The proportions of the components in the composition may also be varied to achieve a particular desired caloric content if the composition is to be used as a reduced calorie high temperature cooking medium. The edible lipid derived from a vegetable, animal, or marine source helps to stabilize the composition while the esterified alkoxylated polyol reduces the number of calories imparted to food cooked in the composition.

The esterified alkoxylated polyol/fatty acid ester blend compositions of this invention are especially useful as partial or complete replacements for the conventional high caloric triglyceride oils used as frying oils or heat transfer media in the preparation of fried foods such as salted savory snacks (e.g., potato chips, corn chips, tortilla chips, cheese curls or puffs, potato sticks), fried desserts (e.g., doughnuts, turnovers, crullers), fried meats (e.g., breaded fish or chicken patties, chicken, turkey, shrimp) as well as any other edible composition prepared using a frying technique. In addition, the compositions can be used alone or in combination with various additives and other ingredients such as flavorants, emulsifiers, stabilizers, regular fats and lipids and other reduced or low calorie fat substitutes or fat mimetics such as polyol fatty acid polyesters(e.g., sucrose polyester or "Olestra", made by Procter & Gamble) as shortening or oil products such as shortenings, margarines, spreads, butter blends, lards, cooking and frying oils, salad oils, popcorn oils, salad dressings, mayonnaise, cheese foods or spreads, and the like. If desired, the compositions of this invention may also be utilized as full or partial replacements for conventional, fully digestible oils, fats, and lipids in other foods such as baked goods, frozen desserts such as ice cream, frozen yogurt, or milkshakes, processed meats such as hot dogs, sausage, luncheon meat, or meat spreads, chocolate products such as candy, nut butters such as peanut butter, icing or frosting, as well as imitation dairy products such as yogurt, cheese, sour cream, coffee creamer, cream and the like. The compositions may be combined with any other type of food ingredient to impart the desired texture, flavor, caloric content, aroma, mouth feel, vitamin or mineral content to the final food or beverage product. These ingredients include, but are not limited to, bulking or bodying agents such as nondigestible carbohydrates (e.g., starch, cellulose and cellulose derivatives), dietary fibers, reduced or full caloric sweeteners, spices, milk, eggs, protein, including microparticulate protein (e.g., "Simplesse", available from the Nutrasweet Division of Monsanto), gums, thickeners, and the like.

If the composition is to be used as a functional fluid, the viscosity, density, pour point, upper temperature limit, and other physical properties may similarly be adjusted as desired by changing the relative proportions of the components of the composition.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate this invention, but are not limitative of the invention in any manner whatsoever.

EXAMPLES

General Testing Procedure

Aliphatic ether compounds were either obtained from commercial sources or synthesized and purified by known methods. Blends of the aliphatic ethers with various fatty acid esters were prepared and tested for thermal and oxidative stability by heating 200 g of each blend at a temperature of from about 190° C. to 200° C. in a 10 inch diameter frying pan coated with a non-stick finish. The aliphatic ethers and fatty acid esters were also tested individually for comparative purposes. The weight of each sample was recorded at specific intervals in order to measure the weight of volatiles lost over time. The results of the stability tests are listed in Table 1.

Preparation of Esterified Propoxylated Glycerin (EPG-1)

Propoxylated glycerin (550 molecular weight) was heated with a mixture of lauric, myristic, palmitic, and stearic acid (hydrogenated coconut fatty acids) at 200°–230° C. under nitrogen until 95% conversion of the hydroxyl groups was obtained (as measured by hydroxyl number analysis). The excess acid was removed by vacuum steam distillation and by the addition of a saturated caustic solution. Following filtration, the remaining fatty acid salts were removed by adsorption onto magnesium silicate. The product was a clear light yellow liquid having a freezing point of −5° C.

Preparation of Esterified Propoxylated Glycerin (EPG-2)

An esterified propoxylated glycerin was prepared in the same manner described above for EPG-1 using 550 molecular weight propoxylated glycerin and a mixture of fatty acids derived from soybean oil.

Discussion of Results

Examples 1–6 demonstrate that an esterified propoxylated glycerin prepared using hydrogenated coconut fatty acids has relatively poor thermal stability at 200° C., even when treated with 1000 ppm of a conventional stabilizer or anti-oxidant. However, Examples 8–10 and 18 show that when the esterified propoxylated glycerin is blended with a lipid such as corn oil, soybean oil or partially hydrogenated vegetable oil having an iodine number of at least about 10, the resulting composition is much more stable at high temperatures than the esterified propoxylated glycerin alone (Example 1).

Furthermore, this enhancement in stability is far greater than would be expected from a simple dilution effect resulting from the presence of the more stable lipids. This becomes apparent when the weight loss observed for each component alone is compared to the results obtained for the blends. For example, a weight loss of about 7 percent would be expected for a 50/50 blend of EPG-1 and corn oil after 4 hours at 200° C. based on the results for EPG-1 (Example 1) and corn oil (Example 12) alone. However, the actual weight loss is only 0.84%, which is only slightly greater than is observed for the corn oil alone.

The dramatic improvement in the thermal stability of an esterified alkoxylated polyol which results when an unsaturated fatty acid ester is blended with the ether in accordance with this invention is illustrated in FIG. 1. The weight loss after 4 hours at ca. 200° C. is plotted as a function of the amount of partially hydrogenated vegetable oil in an EPG-1 composition for Examples 1, 7, 8, and 10. The dotted line represents the weight loss expected from a simple dilution effect, while the solid line represents the enhanced stabilization actually observed. It is evident that the incorporation of even minor amounts of the fatty acid ester provides much greater protection against thermal degradation than would be predicted.

Figure 2:
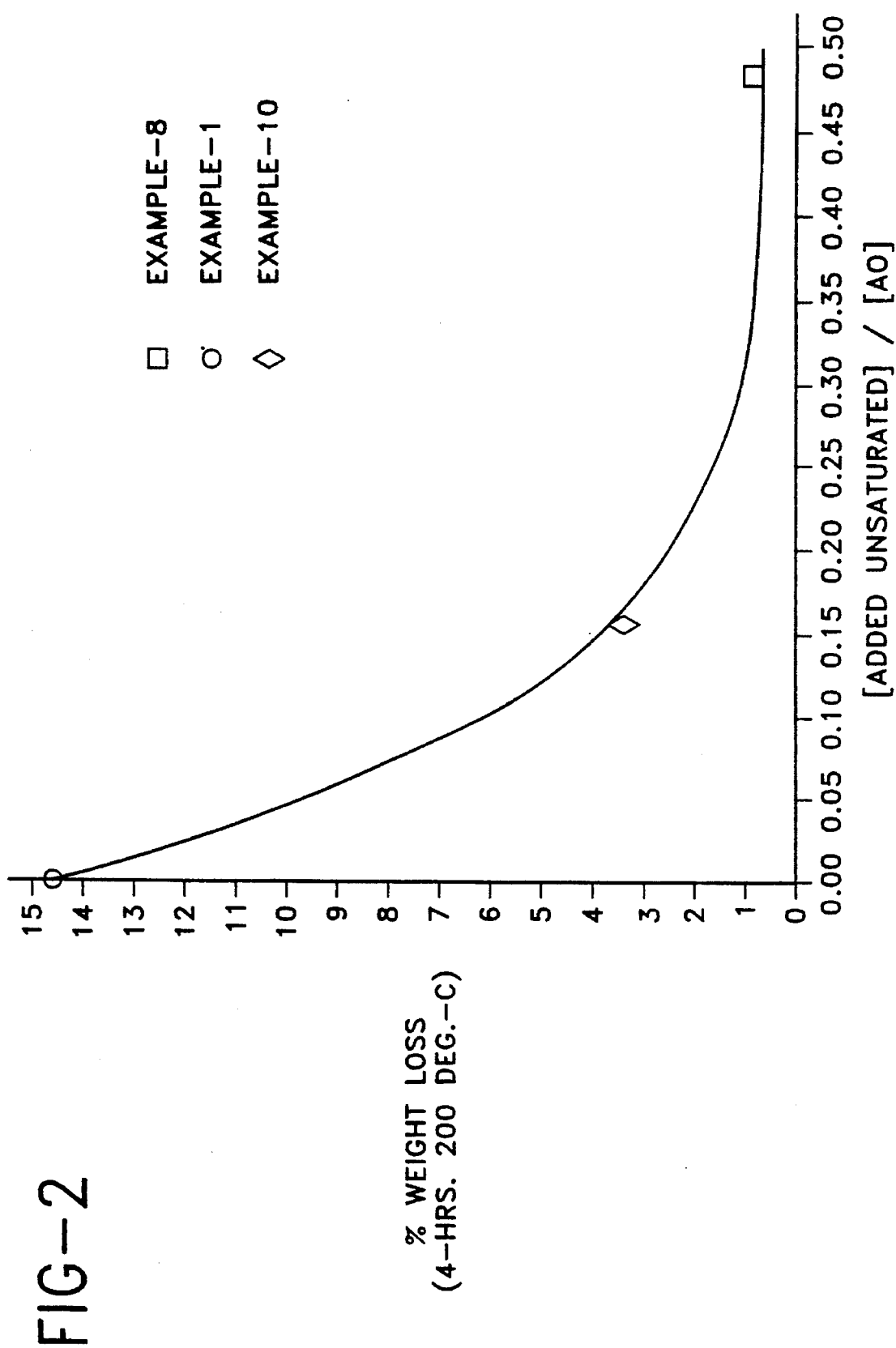

In FIG. 2, the observed weight loss is plotted as a function of the value of $$\frac{\text{milliequivalents fatty acid ester unsaturation per gram}}{\text{milliequivalents oxyalkylene units per gram}}$$

for EPG-1 alone (Example 1) and mixtures of EPG-1 and partially hydrogenated vegetable oil (Examples 8 and 10). This FIG. illustrates the significant and valuable thermal stabilization of an aliphatic ether/fatty acid ester mixture which results when this value exceeds 0.05 or, more preferably, 0.15.

The importance of using a fatty acid ester having an iodine number of at least about 10 is illustrated by Example 17. When tristearin (the triglyceride ester of stearic acid, a completely saturated fatty acid) was blended with EPG-1, the weight loss after 4 hours at 200° C. was close to 8 percent or about the result expected from a dilution effect (i.e., the average of the weight losses observed for tristearin and EPG-1 alone). Unesterified polyalkylene glycol polyols such as polypropylene glycol, polyethylene glycol, and polytetramethylene glycol may similarly be stabilized against thermal degradation by blending with fatty acid esters, as shown by Examples 14, 16, and 20.

Figure 3:
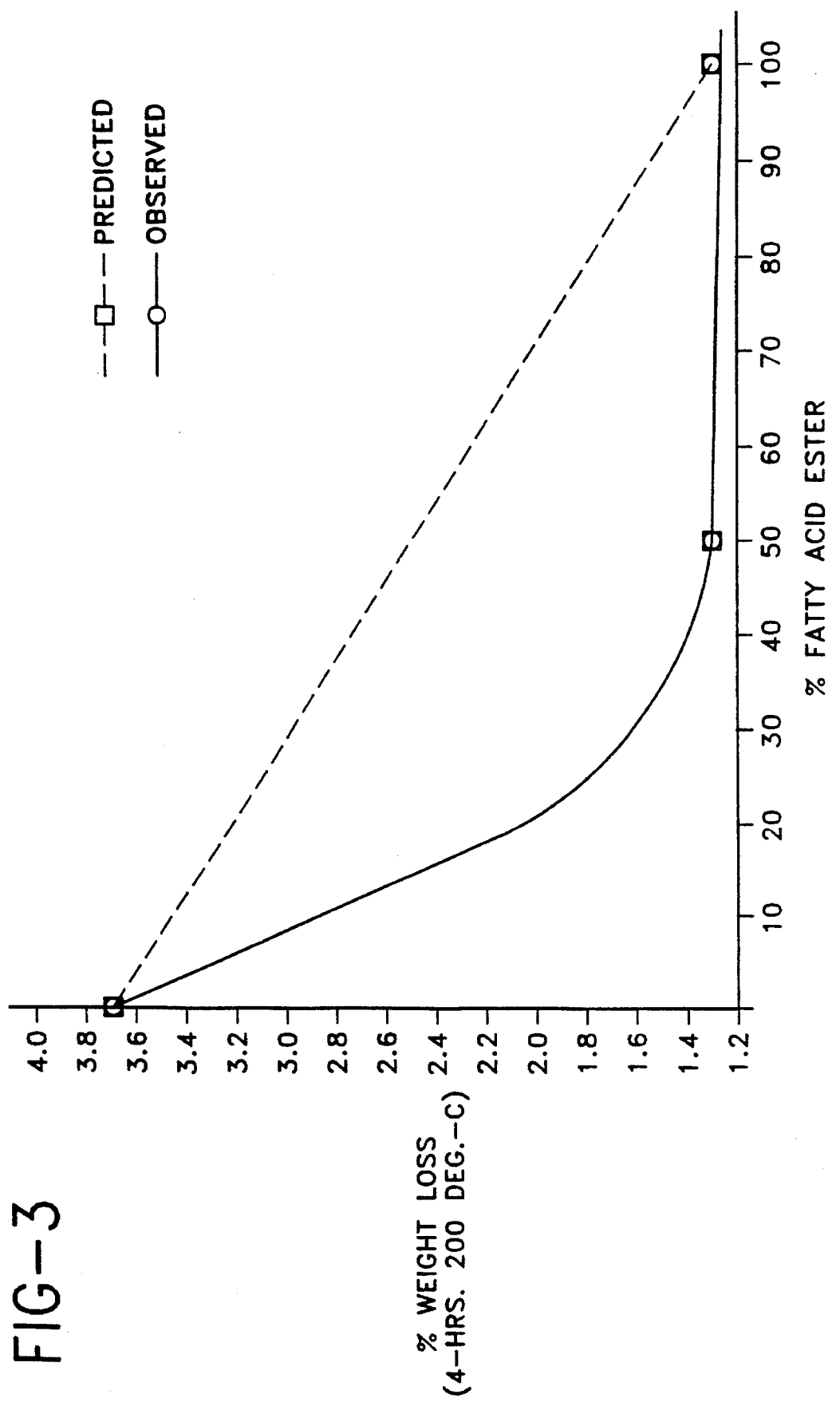

Example 23 shows that the thermal stability of an esterified propoxylated glycerin containing some inherent unsaturation as a result of the use of a mixture of fatty acids containing unsaturated fatty acids during its synthesis is also improved far more than had been expected by blending with an unsaturated fatty acid ester. A 50/50 blend of EPG-2 and partially hydrogenated vegetable oil surprisingly exhibited approximately the same weight loss at 200° C. after 4 hours as the vegetable oil, as shown in FIG. 3, whereas a weight loss intermediate between that of the vegetable oil and EPG-2 alone (Example 22) was predicted.

Examples 24–28

These examples demonstrate that the compositions of this invention are useful as stable high temperature cooking media.

Example 24

Fresh french fry cut potatoes were added to a mixture of 500 mL EPG-2 and 500 mL vegetable oil which had been preheated to 190°–200° C. After frying for 15 minutes, the potatoes were removed from the blend and allowed to drain. The fried potatoes were equivalent in appearance, color, odor, and taste to potatoes fried in pure vegetable oil.

Example 25

The frying procedure of Example 24 was repeated using 500 mL vegetable oil and 500 mL EPG-1. Similar results were observed.

Example 26

A blend of EPG-2 (750 mL) and vegetable oil (250 mL) was prepared and the frying procedure of Example 24 repeated. Once again, the appearance, color, odor, and taste of the fried potatoes were indistinguishable from that of potatoes cooked in pure vegetable oil.

Example 27

When 1000 mL of EPG-1 alone was used as the cooking medium for fresh cut potatoes following the procedure of Example 24, significantly more smoking (indicative of thermal decomposition) was observed than when either pure vegetable oil or EPG/vegetable oil mixtures were employed. However, the appearance, color, odor, and taste of the fried potatoes were not greatly different from food cooked in pure vegetable oil.

Example 28

Fresh chicken legs were fried in a mixture of 500 mL EPG-1 and 500 mL vegetable oil. The amount of smoke generated was no greater than that observed using pure vegetable oil; the appearance, color, odor, and taste were unaffected.

TABLE 1

| EXAMPLE # | ALIPHATIC ETHER TYPE | PARTS | FATTY ACID ESTER TYPE | PARTS | UNSAT.[10] | OA[11] | UNSAT./OA | TEMP. (°C.) AVE. | MAX. | TIME (HR.) | % WEIGHT LOSS |
|---|---|---|---|---|---|---|---|---|---|---|---|
| 1* | EPG-1 | 100 | — | — | 0 | 6.8 | 0 | 191 | 201 | 1 | 3.7 |
| | | | | | | | | | | 4 | 14.7 |
| 2* | EPG-1[1] | 100 | — | — | 0 | 6.8 | 0 | 197 | 206 | 1 | 2.6 |
| | | | | | | | | | | 4 | 26.7 |
| 3* | EPG-1[2] | 100 | — | — | 0 | 6.8 | 0 | 198 | 202 | 1 | 5.9 |
| | | | | | | | | | | 4 | 19.9 |
| 4* | EPG-1[3] | 100 | — | — | 0 | 6.8 | 0 | 195 | 202 | 2 | 8.2 |
| | | | | | | | | | | 4 | 19.9 |
| 5* | EPG-1[4] | 100 | — | — | 0 | 6.8 | 0 | 195 | 200 | 2 | 7.0 |
| | | | | | | | | | | 4 | 21.5 |
| 6* | EPG-1[5] | 100 | — | — | 0 | 6.8 | 0 | 192 | 201 | 2 | 3.8 |
| | | | | | | | | | | 4 | 16.1 |
| 7* | — | — | PHVO[6] | 100 | 3.4 | 0 | — | 198 | 204 | 1 | 0.34 |
| | | | | | | | | | | 4 | 1.3 |
| 8 | EPG-1 | 50 | PHVO[6] | 50 | 1.7 | 3.4 | 0.50 | 194 | 195 | 1 | 0.31 |
| | | | | | | | | | | 4 | 0.80 |
| 9 | EPG-1[1] | 50 | PHVO[6] | 50 | 1.7 | 3.4 | 0.50 | 194 | 202 | 1 | 0.23 |
| | | | | | | | | | | 4 | 1.9 |
| 10 | EPG-1 | 75 | PHVO[6] | 25 | 0.85 | 5.1 | 0.17 | 190 | 199 | 1 | 0.83 |
| | | | | | | | | | | 4 | 3.2 |
| 11 | EPG-1 | 50 | Corn Oil | 50 | 2.5 | 3.4 | 0.68 | 193 | 199 | 1 | 0.70 |
| | | | | | | | | | | 4 | 1.6 |
| 12* | — | — | Corn Oil | 100 | 5.0 | 0 | — | 205 | 207 | 1 | 0.74 |
| | | | | | | | | | | 4 | 0.84 |
| 13* | PG-550[7] | 100 | — | — | 0 | 14.3 | 0 | 192 | 205 | 1 | 10.8 |
| | | | | | | | | | | 4 | 42.4 |
| 14 | PG-550[7] | 50 | PHVO[6] | 50 | 1.7 | 14.3 | 0.12 | 190 | 198 | 1 | 2.0 |
| | | | | | | | | | | 4 | 5.6 |
| 15* | EG-8000[8] | 100 | — | — | 0 | 22.7 | 0 | 194 | 202 | 1 | 3.0 |
| | | | | | | | | | | 4 | 9.2 |
| 16 | EG-8000[8] | 50 | Corn Oil | 50 | 2.5 | 22.7 | 0.11 | 195 | 199 | 1 | 0.81 |
| | | | | | | | | | | 4 | 0.84 |
| 17* | EPG-1 | 50 | Tristearin | 50 | 0 | 0 | — | 195 | 206 | 1 | 2.08 |
| | | | | | | | | | | 4 | 7.95 |
| 18 | EPG-1 | 50 | Soybean Oil | 50 | 2.6 | 3.4 | 0.76 | 194 | 201 | 1 | 0.51 |
| | | | | | | | | | | 4 | 1.93 |
| 19* | Poly THF[9] | 100 | — | — | 0 | 13.9 | 0 | 197 | 204 | 1 | 7.3 |
| | | | | | | | | | | 4 | 21.4 |
| 20 | Poly THF[9] | 50 | PHVO[6] | 50 | 1.7 | 6.9 | 0.25 | 197 | 201 | 1 | 3.6 |

TABLE 1-continued

| EXAMPLE # | ALIPHATIC ETHER TYPE | PARTS | FATTY ACID ESTER TYPE | PARTS | UNSAT.[10] | OA[11] | UNSAT./ OA | TEMP. (°C.) AVE. | MAX. | TIME (HR.) | % WEIGHT LOSS |
|---|---|---|---|---|---|---|---|---|---|---|---|
| 21*[12] | — | — | Tristearin | 100 | 0 | 0 | — | 193 | 202 | 4 1 4 | 6.15 2.0 3.7 |
| 22* | EPG-2 | 100 | — | — | 0 | 5.8 | 0 | 196 | 200 | 1 4 | 2.2 3.7 |
| 23 | EPG-2 | 50 | PHVO | 50 | 1.7 | 2.9 | 0.58 | 198 | 205 | 1 4 | 0.7 1.3 |

NOTES:
*Comparative example
[1]Containing 1000 ppm α-tocopherol
[2]Containing 1000 ppm mixed tocopherols
[3]Containing 1000 ppm TBHO (tert-butylhydroquinone)
[4]Containing 1000 ppm BHT (butylated hydroxytoluene)
[5]Containing 1000 ppm BHA (butylated hydroxyanisole)
[6]Partially Hydrogenated Vegetable Oil (Crisco ®shortening, a product of Procter & Gamble)
[7]Propoxylated glycerin, 550 molecular weight
[8]Polyethylene oxide, 8000 molecular weight (Carbowax 8000, sold by Union Carbide)
[9]Polytetrahydrofuran, 650 molecular weight
[10]milliequivalents fatty acid ester unsaturation per gram of total composition
[11]milliequivalents oxyalkylene units per gram of total composition
[12]only 100 g sample was used; % weight loss observed was higher than would be expected if 200 g sample was used

I claim:

1. A composition suitable for use as a high temperature reduced calorie cooking medium comprising:

(a) from about 10 to 90 weight percent of a fatty acid ester of glycerin having an iodine number of at least about 50; and (b) from about 10 to 90 weight percent of an esterified alkoxylated polyol;

wherein the value of $$\frac{\text{milliequivalents fatty acid ester unsaturation per gram}}{\text{milliequivalents oxyalkylene units per gram}}$$

in the composition is at least about 0.05.

2. The composition of claim 1 wherein the fatty acid ester of glycerin is a lipid selected from the group consisting of corn oil, olive oil, safflower oil, cottonseed oil, peanut oil, soybean oil, rapeseed oil, sunflower oil, partially hydrogenated derivatives thereof having an iodine number of at least about 50, and mixtures thereof.

3. The composition of claim 1 wherein the fatty acid ester of glycerin is a triglyceride containing $C_{12}$–$C_{24}$ fatty acid ester groups.

4. The composition of claim 1 wherein the value of $$\frac{\text{milliequivalents fatty acid ester unsaturation per gram}}{\text{milliequivalents oxyalkylene units per gram}}$$

in the composition is at least about 0.15.

5. The composition of claim 1 comprising from about 25 to 75 weight percent of the fatty acid ester of glycerin and from about 25 to 75 weight percent of the esterified alkoxylated polyol.

6. The composition of claim 1 wherein the esterified alkoxylated polyol is an esterified propoxylated glycerin.

7. The composition of claim 1 wherein the esterified alkoxylated polyol has the general structure

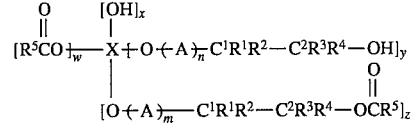

wherein X is an organic radical derived from a polyol, the sum of w+x+y+z is from 2 to 8, $$\frac{x+y}{w+x+y+z}$$

is an average number in the range of 0 to about 0.50, z is an average number in the range of from about 2 to the sum of w+x+y+z, (m·z) + (n·y) on average is in the range of from 0 to about 25, A is an oxyalkylene unit, $R^5$ is a $C_7$–$C_{23}$ hydrocarbon group, at least one of $R^1$, $R^2$, $R^3$, or $R^4$ is a moiety other than hydrogen, and $C^2$ is a carbon that on average is from 0 to about 15 percent primary.

8. The composition of claim 7 wherein said polyol is selected from the group consisting of glycols, triols, tetrols, sugar alcohols, monosaccharides, and disaccharides.

9. The composition of claim 7 wherein said polyol is glycerin, Z is an average number in the range of from about 2 to 3, A is an oxypropylene unit, and one only of $R^1$, $R^2$, $R^3$, and $R^4$ is methyl with the other R groups being hydrogen, and ester group

is derived from a $C_{12}$–$C_{22}$ fatty acid.

10. The composition of claim 7 wherein the esterified alkxoylated polyol has an iodine number less than about 10.

11. A composition suitable for use as a high temperature reduced calorie cooking medium comprising:

(a) from about 25 to 75 weight percent of a $C_{12}$–$C_{24}$ fatty acid triglyceride having an iodine number of at least about 50; and (b) from about 25 to 75 weight percent of an esterified propoxylated glycerin;

wherein the value of $$\frac{\text{milliequivalents fatty acid ester unsaturation per gram}}{\text{milliequivalents oxypropylene units per gram}}$$

in the composition is at least about 0.15.

12. A method of thermally stabilizing an esterified alkoxylated polyol which comprises forming a mixture of
  (a) from 10 to 90 parts by weight of the esterified alkoxylated polyol; and
  (b) 100−X parts by weight of a fatty acid ester of glycerin having an iodine number of at least about 50, wherein X represents the parts by weight of the esterified alkoxylated polyol such that the value of $$\frac{\text{milliequivalent fatty acid ester unsaturation per gram}}{\text{milliequivalent oxyalkylene units per gram}}$$

in the mixture is at least about 0.05.

13. The method of claim 12 wherein the fatty acid ester of glycerin is a lipid selected from the group consisting of corn oil, olive oil, safflower oil, cottonseed oil, peanut oil, soybean oil, rapeseed oil, sunflower oil, partially hydrogenated derivatives thereof having an iodine number of at least about 50, and mixtures thereof.

14. The method of claim 12 wherein the fatty acid ester of glycerin is a triglyceride containing $C_{12}$–$C_{24}$ fatty acid ester groups.

15. The method of claim 12 wherein the value of $$\frac{\text{milliequivalent fatty acid ester unsaturation per gram}}{\text{milliequivalent oxyalkylene units per gram}}$$

in the mixture is at least about 0.15.

16. The method of claim 12 wherein X is from 25 to 75.

17. The method of claim 12 wherein the esterified polyol is an esterified propoxylated glycerin.

18. The method of claim 12 wherein the esterified alkoxylated polyol has the general structure

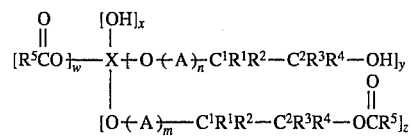

wherein X is an organic radical derived from a polyol, the sum of w+x+y+z is from 2 to 8, $$\frac{x+y}{w+x+y+z}$$

is an average number in the range of 0 to about 0.50, z is an average number in the range of from about 2 to the sum of w+x+y+z, on average is in the range of from 0 to about 25, A is an oxyalkylene unit, $R^5$ is a $C_7$–$C_{23}$ hydrocarbon group, at least one of $R^1$, $R^2$, $R^3$, or $R^4$ is a moiety other than hydrogen, and $C^2$ is a carbon that on average is from 0 to about 15 percent primary.

19. The method of claim 18 wherein said polyol is selected from the group consisting of glycols, triols, tetrols, sugar alcohols, monosaccharides, and disaccharides.

20. The method of claim 18 wherein said polyol is glycerin, Z is an average number in the range of from about 2 to 3, A is an oxypropylene unit, and one only of $R^1$, $R^2$, $R^3$, and $R^4$ is methyl with the other R groups being hydrogen, and ester group

is derived from a $C_{12}$–$C_{22}$ fatty acid.

21. The method of claim 18 wherein the esterified alkoxylated polyol has an iodine number less than 10.

* * * * *